United States Patent
Bremer et al.

(10) Patent No.: US 12,013,827 B2
(45) Date of Patent: Jun. 18, 2024

(54) DUPLICATE DETERMINATION IN A GRAPH USING DIFFERENT VERSIONS OF THE GRAPH

(71) Applicant: International Business Machines Corporation, Armonk, NY (US)

(72) Inventors: Lars Bremer, Boeblingen (DE); Thuany Karoline Stuart, Nice (FR); Hemanth Kumar Babu, Böblingen (DE); Martin Anton Oberhofer, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 17/648,194

(22) Filed: Jan. 18, 2022

(65) Prior Publication Data
US 2023/0229644 A1    Jul. 20, 2023

(51) Int. Cl.
*G06F 16/21*    (2019.01)
*G06F 16/215*    (2019.01)
*G06F 18/22*    (2023.01)

(52) U.S. Cl.
CPC .......... *G06F 16/219* (2019.01); *G06F 16/215* (2019.01); *G06F 18/22* (2023.01)

(58) Field of Classification Search
CPC ...... G06F 16/219; G06F 16/215; G06F 18/22; G06F 16/21
See application file for complete search history.

(56) References Cited

U.S. PATENT DOCUMENTS

| | | | |
|---|---|---|---|
| 10,268,735 B1* | 4/2019 | White | G06F 16/9024 |
| 10,331,362 B1* | 6/2019 | Parekh | G06F 16/1748 |
| 10,901,715 B1* | 1/2021 | Raiman | G06F 9/4552 |
| 2016/0283541 A1* | 9/2016 | Iyer | G06F 16/2365 |
| 2019/0361876 A1 | 11/2019 | Rogynskyy | |
| 2020/0366580 A1* | 11/2020 | Sinha | H04L 67/1012 |
| 2020/0379752 A1* | 12/2020 | Rodrigues Rosa Junior | G06F 16/9014 |
| 2021/0089512 A1 | 3/2021 | Fuchs | |
| 2021/0089520 A1 | 3/2021 | Oberhofer | |
| 2021/0149734 A1* | 5/2021 | Gurfinkel | G06F 9/4843 |
| 2021/0342352 A1* | 11/2021 | Stuart | G06F 16/9024 |
| 2022/0138492 A1* | 5/2022 | Paulson | G16Y 40/35 706/12 |

OTHER PUBLICATIONS

Castelltort et al., "Representing history in graph oriented nosql databases: A versioning system", In ICDIM, pp. 228-234, 2013.
Disclosed Anonumously, "System and Method for Predictive Pre-Run Probabilistic Match Configurator", IP.com, IPCOM000265054D, Feb. 21, 2021, 5 pages.

* cited by examiner

*Primary Examiner* — Maher N Algibhah
(74) *Attorney, Agent, or Firm* — Michael O'Keefe

(57) ABSTRACT

Duplicating identification in a graph having a second version. The graph includes nodes representing entities and edges representing relationships between the entities. The method includes: providing a previous first version of the graph. At least two target nodes of the graph may be identified. The first version and the second version of the graph may be compared for determining a comparison score indicative of a similarity between the two target nodes. The comparison score may be used for determining whether the two target nodes are duplicates with respect to each other.

16 Claims, 6 Drawing Sheets

| Compared Values | Score | Penalty | Final Score |
|---|---|---|---|
| R1-1 Name R2-2 Name | 0.8 | 0.15 (one outdated) | 0.65 |
| R1-2 Name R2-2 Name | 0.13 | 0.0 (both current) | 0.13 |
| R1 Address R2 Address | 0.75 | 0.0 (both current) | 0.75 |
| R1-2 DOB R2-1 DOB | 0.5 | 0.15 (one outdated) | 0.35 |
| R1-2 DOB R2-2 DOB | 0.4 | 0.0 (both current) | 0.4 |

| Compared Records | Score | Penalty | Final Score |
|---|---|---|---|
| R1-2 & R2-1<br>Residency edge to node L1 | 0.9 | 0.0 (both current) | 0.9 |
| R1-1 & R2-1<br>Spouse edge to node R3 | 0.9 | 0.15 (one outdated) | 0.75 |
| R1-2 & R2-1<br>Spouse edge to node R3 | 0.05 | 0.0 (both current) | 0.05 | dupli-
DUPLICATE DETERMINATION IN A GRAPH USING DIFFERENT VERSIONS OF THE GRAPH

BACKGROUND

The present invention relates to the field of digital computer systems, and more specifically, to a method for duplicate determination in a graph.

A database system may, for example, use graph structures for semantic queries with nodes, edges, and properties to represent and store data. The graph relates the data items in the store to a collection of nodes and edges, the edges representing the relationships between the nodes. The relationships allow data in the store to be linked together directly and, in many cases, retrieved with one operation.

SUMMARY

Various embodiments provide a method for duplicate determination in a graph, computer system and computer program product as described by the language of the independent claims. Advantageous embodiments are described in the dependent claims. Embodiments of the present invention can be freely combined with each other if they are not mutually exclusive.

In one aspect, the invention relates to a computer implemented method for duplicate identification in a graph having a second version, the graph comprising nodes representing entities and edges representing relationships between the entities. The method comprises: (i) providing a at least one previous first version of the graph; (ii) identifying at least two target nodes of the graph; (iii) comparing the at least one first version and the second version of the graph for determining a comparison score indicative of a similarity between the two target nodes; and (iv) using the comparison score for determining whether the two target nodes are duplicates with respect to each other.

In another aspect, the invention relates to a computer program product comprising a computer-readable storage medium having computer-readable program code embodied therewith, the computer-readable program code configured to implement all of steps of the method according to preceding embodiments.

In yet another aspect, the invention relates to a computer system for duplicate identification in a graph having a second version, the graph comprising nodes representing entities and edges representing relationships between the entities. The computer system is configured for: (i) providing at least one previous first version of the graph; (ii) identifying at least two target nodes of the graph; (iii) comparing each of the at least one first version of the graph with the second version of the graph for determining a comparison score indicative of a similarity between the two target nodes; (iv) using the comparison score for determining whether the two target nodes are duplicates with respect to each other.

The at least one previous first version of the graph may, for example, comprise one first previous version of the graph e.g., $v_0$, the current second version being $v_2$. The at least one previous first version of the graph may, for example, comprise multiple first previous versions of the graph e.g., previous first version $v_0$ and another previous first version $v_1$. The term "first" is used for naming purposes to indicate that the "first version" is not a current version. The term "second" is used for naming purpose to indicate that the "second version" is a current version.

DETAILED DESCRIPTION

Figure 1:
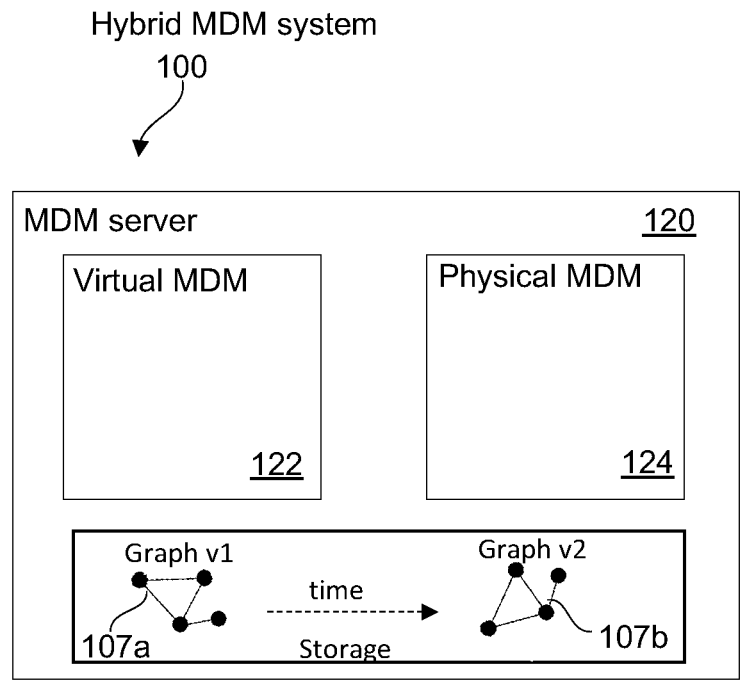
FIG. 1 is a diagram of a computer system in accordance with an embodiment of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable those of ordinary skill in the art to understand the embodiments disclosed herein.

An example provides a computer implemented method for duplicate identification in a graph having a second version, the graph comprising nodes representing entities and edges representing relationships between the entities. The method comprises: providing at least one previous first version of the graph; identifying at least two target nodes of the graph; comparing each graph of the at least one first version of the graph with the second version of the graph for resulting in at least one comparison score respectively, the at least one comparison score being indicative of a similarity between the two target nodes; using the at least one comparison score for determining whether the two target nodes are duplicates with respect to each other. In one example, in case the at least one first version comprises multiple first versions, the method comprises selecting the highest one of the resulting comparison scores, and using the selected comparison score for determining whether the two target nodes are duplicates with respect to each other. Using multiple previous versions may be advantageous. For example, the provided at least one previous first version of the graph comprises all previous first versions of the graph, or just previous first versions of the past X days or the last X previous first versions of the graph.

A graph refers to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also called as vertices) and edges. The edge of the graph connects any two nodes of the graph. The edge may be represented by an ordered pair (n1, n2) of nodes and that can be traversed from node n1 (starting node) toward node n2. A node of the graph may represent an entity. The entity refers to a user, object etc.

The entity may have certain entity attributes or properties which may be assigned values. For example, a person may be an entity. The entity attributes of the person may, for example, include a marital status, age, etc. The edge may be assigned edge attribute values indicative of at least a relationship between the two nodes connected to the edge. The relationship may, for example, comprise an inheritance relationship (such as a parent and child) and/or associative relationship in accordance with a certain hierarchy. For example, the inheritance relationship between nodes n1 and n2 may be referred to as a "is-a relationship" between n1 and n2 e.g., "n2 is-a parent of n1". The associative relationship between nodes n1 and n2 may be referred to as a "has-a relationship" between n1 and n2 e.g., "n2 has a has-a relationship with n1" means that n1 is part or is a composition of or associated with n2.

The graph may represent entities and relationships of a set of one or more domains. A domain (also referred to as domain ontology) represents concepts or categories which belong to topical subject matter. The domain typically models domain-specific definitions of terms. For example, a domain can refer to a healthcare, advertising, commerce, medical and/or biomedical-specific field. The set of one or more domains may represent an ontology. For example, the set of domains may comprise a family domain and company domain, wherein the family domain and company domain belong to a same ontology which may be an employee ontology.

A graph may have different versions. If a graph is said to have version $v_1$, this means that each element of the graph, namely, nodes and edges, have also version $v_1$. However, this does not mean that each element of the previous version $v_{i-1}$ of the graph has changed. That is, an element having version $v_1$ may or may not be different from the version $v_{i-1}$ of the element. This is because a graph of version e.g., $v_1$ may be assigned a newer version $v_2$ not if all its elements have changed but if a part of it has changed. This part may be at least one entity attribute of the graph of version $v_1$ and/or new nodes have been added and/or edges have been updated or added in the graph of version $v_1$. The element of a graph may, for example, comprise a node or edge. A change of an element may include a modification of one or more attributes of the element or a deletion of the element. The change of a graph may include an insertion of a new element in the graph.

Processing the graphs may however technically be challenging in case of data deduplication. For example, a master data management (MDM) system uses graphs as persistency storage to identify duplicate records and may need to resolve them if applicable. This process is a matching process and uses deterministic and/or probabilistic matching techniques with fuzzy operators such as phonetics (Soundex, NYSIIS, etc.), edit distance, nick name resolution, etc. Embodiments of the present invention improve the performance of this kind of processes. For that, the matching in accordance with embodiments of the present invention use the evolution over time of the content of the graph. By considering not only current attributes values and relationships, but also old ones, the matching engine can match entities that were once similar. The present method may be provided as a comparison method of the matching engine which determines, based on current and previous versions of the relationships, a probabilistic score on the relationships either individually or collectively whether or not they contribute to the match decision.

The comparison of the first version and the second version of the graph for determining a comparison score indicative of a similarity between the two target nodes may advantageously be performed in different ways, e.g., at node level, at subgraph level and/or at attribute level. In all cases, the present method may penalize the result of the comparison of two versions of each element if the two versions are different.

According to one embodiment, comparing the first version and the second version of the graph comprises: comparing the first version of one target node of the two target nodes with the first version of the other target node of the two target nodes, resulting in a first data similarity score, comparing the first version of the one target node with the second version of the other target node, resulting in a second data similarity score, comparing the second version of the one target node with the first version of the other target node, resulting in a third data similarity score, comparing the second version of the one target node with the second version of the other target node, resulting in a fourth data similarity score, weighting with a penalty weight the first, second and third data similarity scores that resulted from a comparison involving the first version of a node which is different from the second version of the node, using a highest data similarity score of the weighted data similarity scores and the fourth data similarity score for obtaining the comparison score. This embodiment comprises comparing each version of one target node with each version of the other target node resulting in the data similarity scores. The penalty weight may, for example, be a float value smaller than one. The penalty weight may be subtracted from or multiplied by the score to be weighted.

According to one embodiment, the entity has a set of entity attributes, wherein comparing a given version of the one target node with a given version of the other target node, the given version being the first or second version, comprises: for each entity attribute $ATT_i$ (i=1, ... n, n being the number of attributes) of the set of entity attributes: comparing each version of the entity attribute of the one target node with each version of said entity attribute of the other target node, each comparison resulting in an individual data similarity score, combining the individual data similarity scores for obtaining one of the first, second, third or fourth data similarity score.

When comparing two nodes, an attribute score $S_{att}^i$ may be determined for each attribute $ATT_i$ (i=1, ... n, n being the number of attributes) of the set of attributes, which is indicative of a comparison result of the values of the attribute $ATT_i$ in the two compared nodes. The attribute scores $S_{att}^i$ may be combined for determining the first, second, third or fourth data similarity score depending on which nodes are compared. The combination of the attribute scores may for example be the sum of the attribute scores, $\Sigma_{i=1}^n S_{att}^i$. In another example, the combination of the attribute scores may be the weighted sum of the attribute scores using weights $w_i$ assigned to the entity attributes, $\Sigma_{i=1}^n w_i \times S_{att}^i$ e.g., if two persons are compared, the last name may have a higher weight compared to the address attribute etc.

According to one embodiment, the entity has a set of entity attributes, wherein comparing the first version and the second version of the graph comprises: comparing the entity attributes of the two target nodes comprising: for each entity attribute of the entity attributes: comparing each version of the entity attribute of one target node with each version of said entity attribute of the other node, each comparison resulting in an individual data similarity score, weighting with a penalty weight the individual data similarity scores that resulted from a comparison involving the first version of an entity attribute which is different from the second version of the entity attribute, selecting a highest data similarity score of the individual data similarity scores of the entity attribute, combining the selected data similarity scores of the set of entity attributes for obtaining the comparison score.

According to one embodiment, comparing the first version and the second version of the graph comprises: determining a neighbourhood subgraph for each of the two target nodes in the first version and second version of the graph, the neighbourhood subgraph including the respective target node, comparing the first version neighbourhood subgraph of one target node of the two target nodes with the first version neighbourhood subgraph of the other target node of the two target nodes, resulting in a first structure similarity score, comparing the first version neighbourhood subgraph of the one target node with the second version neighbourhood subgraph of the other target node, resulting in a second structure similarity score, comparing the second version neighbourhood subgraph of the one target node with the first version neighbourhood subgraph of the other target node, resulting in a third structure similarity score, comparing the second version neighbourhood subgraph of the one target node with the second version neighbourhood subgraph of the other target node, resulting in a fourth structure similarity score, weighting with a penalty weight the first, second and third structure similarity scores that resulted from a comparison involving the first version of a subgraph which is different from the second version of the subgraph, using a highest structure similarity score of the weighted structure similarity scores and the fourth structure similarity score for obtaining the comparison score.

In one example, the comparisons performed in the previous embodiments at the entity level, node level or subgraph level may be improved as follows. When comparing each version of the versions v1 and v2 of a first element with each version of the versions v1 and v2 of a second element, some comparisons may be skipped as follows (the element is one of: an entity attribute, node or subgraph). If version v1 of the second element is the same as version v2 of the second element, and version v1 of the first element is different from version v2 of the first element, then only two comparisons (instead of four) may be performed between versions v1 and v2 of the first element with one of the versions v1 and v2 of the second element. This is because, the non-performed comparisons would result in the same score as those performed comparisons, which does not influence the selection of the highest score. This may save processing resources.

According to one embodiment, obtaining the comparison score comprises combining the highest structure similarity score with the highest data similarity score.

According to one embodiment, comparing a given version of the neighbouring subgraph of the one target node with a given version of the neighbouring subgraph of the other target node, the given version being the first or second version, comprises: comparing each edge of the given version of the neighbouring subgraph of the target node with a corresponding edge of the given version of the neighbouring subgraph of the other target node, resulting in an individual structure similarity score, combining the individual structure similarity scores for obtaining one of the first, second, third or fourth structure similarity score.

According to one embodiment, comparing the first version and the second version of the graph comprises: determining a neighbourhood subgraph for each of the two target nodes in the first version and second version of the graph, the neighbourhood subgraph including the respective target node, comparing each version of the neighbouring subgraph of the target node with each version of the neighbouring subgraph of the other target node, wherein comparing a given version of the neighbouring subgraph of the target node with a given version of the neighbouring subgraph of the other target node, the given version being the first or second version, comprises: comparing each edge of the given version of the neighbouring subgraph of the target node with a corresponding edge of the given version of the neighbouring subgraph of the other target node, resulting in an individual structure similarity score, weighting with a penalty weight the individual structure similarity scores if they resulted from a comparison involving the first version, combining the individual structure similarity scores for obtaining the comparison score.

The matching in accordance with embodiments of the present invention combine different scores that result from independent comparisons of nodes of surrounding subgraphs. This may enable to identify entities as duplicates if their relationship network to neighbouring entities shows a high degree of similarity. In graph terms, if two records represented as nodes in the graph have a high degree of local subgraph similarity and high degree of similarity between them, they may be considered as duplicates. As a result, very important insights of whether or not two records should be merged is factored into the decision making process producing optimal results. Embodiments of the present invention may thereby improve the accuracy of deduplication processes.

According to one embodiment, the determining of the neighbourhood subgraph of the node comprises: selecting nodes of the graph using a selection criterion, the selection criterion being based on at least one of: a number of nodes, an entity represented by a node, a distance between the node and another node in the subgraph; the subgraph comprising the selected nodes. This may enable an automatic and thus efficient duplicate determination in accordance with embodiments of the present invention.

According to one embodiment, the selection criterion requires at least one of: the number of nodes of the subgraph being smaller than a maximum number, the edge of the subgraph connected to at least one node that represents a same entity as the entity of the node; and the distance between the node and another node in the subgraph is smaller than a threshold number of edges. For example, the computer system may be provided with configurable parameters associated with these criteria. The configurable parameters may dynamically be adapted depending on the use cases. The selection criterion may enable to reduce computation overhead e.g., as larger nodes may increase computation power, the user may be enabled to configure the parameters associated with the nodes in the selection criterion to improve performances.

According to one embodiment, the determining of the neighbourhood subgraphs comprises removing duplicate nodes of each subgraph of the neighbourhood subgraphs.

According to one embodiment, the method further comprises using a received indication of the two identified target nodes for the identifying of the target nodes. For example, a user may provide an input or a request. The received request or input comprises information about the at least two nodes. This information may be used to identify the at least two nodes in the graph.

According to one embodiment, determining whether the two target nodes are duplicates with respect to each other comprises: in case the comparison score is higher than an upper threshold, determining that that the two target nodes are duplicates with each other; in case the comparison score is between a lower and the upper thresholds prompting a user for determining whether the two target nodes are duplicates with respect to each other.

FIG. 1 is a diagram of a hybrid MDM system in accordance with an embodiment of the present invention.

The hybrid MDM system 100 comprises an MDM server 120. MDM server 120 includes virtual MDM 122 and physical MDM 124. In one example, virtual MDM 122 and physical MDM 124 may be found on the same computer (i.e., MDM server 120). In an alternative example, virtual MDM 122 and physical MDM 124 may be found on computer 110 or separate computers (not shown) interconnected via a network.

Virtual MDM 122 is a virtual style of MDM implementation where master data is managed such that it remains fragmented across multiple source systems (not shown) in a distributed manner with a central indexing service. In other words, the master data for virtual MDM 122 is stored or created in a distributed arrangement across multiple source systems (not shown) and remains fragmented across those source systems (not shown). Virtual MDM 122 is a central indexing service for the distributed data. Virtual MDM 122 may provide a trusted view of the linked and matched information to the user on demand. A single view of the master data information of Virtual MDM 122 may not be persisted in Virtual MDM 122 and modifications to the master data are made on the source systems (not shown).

Physical MDM 124 is a physical style of MDM implementation where master data is managed such that it is stored or created in a centralized system from where it is accessed. In other words, the master data for Physical MDM 124 is created on MDM server 120, remains on MDM server 120, and is accessed via MDM server 120. Physical MDM 124 is a central indexing service for the centralized data. Physical MDM 124 may allow a user to access, view, modify, change, update, etc. information found in physical MDM 124. All information relevant to providing a single view of the master data is stored in Physical MDM 124. In other words, after all the matching and collapsing of records across the source system, only a single view of the master data remains in the repository. Physical MDM 124 then becomes the system of record for centrally managing the master data.

Hence, the virtual MDM 122 may process records (named source records) of different source systems, wherein the source records may be modified (locally) at the source systems. These source records may be linked to build new golden records (also referred to as entities) that may be provided by the physical MDM 124 e.g., a golden record may be linked with two or more source records which represent the same entity. The source records and the golden records may be stored as a graph in the hybrid MDM system 100, wherein edges of the graph may comprise links between source records and associated golden records and other edges linking the source or golden records to other records. E.g., two source records r1 and r2 representing a person X may be provided by two source systems and may be linked to build a single golden record e1. In this case, the graph may comprise three nodes representing r1, r2, and e1 respectively and two edges linking r1 and r2 to e1 respectively to indicate that they are linked to a same golden record. The graph may further comprise further edges such as an edge linking the node of record r1 to a fourth node that represents a relative of the person X.

For example, the hybrid MDM system 100 may comprise one or more versions of a graph. For example, the MDM system 100 may comprise a first version $v_1$ of a graph 107a and a second version $v_2$ of the graph 107b. For easy of description, each node and each edge of the graph may be assigned a version that corresponds to the version of the graph e.g., nodes and edges of the first version graph have version $v_1$, and nodes and edges of the second version graph have version $v_2$. However, although tagged with different version numbers $v_1$ and $v_2$, the content of a node may be the same in the two graphs 107a and 107b. This is because the two versions 107a and 107b may merely differ by at least one entity attribute and/or by number of nodes and/or edges etc. Similarly, each entity attribute of a node may be assigned a version that corresponds to the version of the node. Thus, the entity attributes of a node of version $v_1$ have version $v_1$, and the entity attributes of a node of version $v_2$ have version $v_2$.

Figure 2:
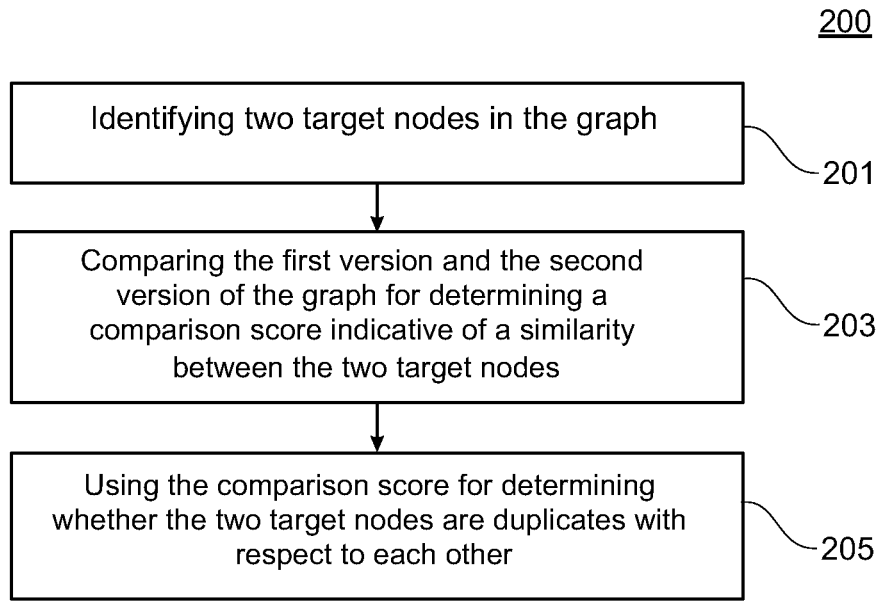
FIG. 2 is a flowchart of a method for duplicate determination in a graph in accordance with an embodiment of the present invention.

Flowchart 200 of FIG. 2 is a flowchart of a method for duplicate determination in a graph 107b in accordance with an embodiment of the present invention. For the purpose of explanation, the method may be implemented in the computer system 100 illustrated in previous FIG. 1, but is not limited to this implementation. The method may, for example, be performed by the hybrid MDM system 100.

At least two nodes may be identified or determined in the graph 107b in step 201. The two identified nodes tnode1 and tnode2 may be target nodes that may need to be determined whether they represent the same entity i.e., whether they are duplicate nodes. In one example, two nodes may be identified in step 201. In another example, more than two nodes may be identified in step 201. Identifying the nodes in step 201 may, for example, be performed automatically e.g., the two nodes may randomly be selected from the graph 107b. This may be advantageous in case of a need to deduplicate the whole graph. In another example, the identifying of the nodes may be performed using an information or request received from a user. The received information or request may indicate nodes. Those indicated nodes may be identified in step 201. In another example, the identifying of the nodes in step 201 may be performed in response to inserting or adding a new node in the graph 107b, wherein the inserted node is part of the identified nodes. This may enable a controlled data storage in the graph 107b. For simplification of the description, the number of the identified nodes in step 201 may be two target nodes named tnode1 and tnode2 but it is not limited to.

The first version 107a and the second version 107b of the graph may be compared in step 203 for determining a comparison score CScore indicative of a similarity between the two target nodes tnode1 and tnode2.

The comparison score CScore may be used in step 205 for determining whether the two target nodes are duplicates with respect to each other. If, for example, the comparison score is above an upper threshold, it may be indicated on the graph that the target nodes refer to the same real-world entities (target nodes are a match). In case it is determined that the two target nodes tnode1 and tnode2 are duplicate nodes, the two nodes tnode1 and tnode2 may be merged and a correct edge embedding may be reestablished in the graph 107. In case the comparison score is between a lower and the upper threshold: a clerical task may be created. In case the comparison score is below the lower threshold, nothing is to be done (target nodes are not a match).

In case the graph has more than one version that precedes the current version $v_2$ e.g., the graph has a first version $v_0$, another first version $v_1$ of the graph and the current second version $v_2$, the comparison of step 203 may be performed between each of the previous versions of the graph (e.g., $v_0$ and $v_1$) with the second version of the graph $v_2$. This may result in individual comparison scores (e.g., one for the pair $(v_0, v_2)$ and the other for the pair $(v_1, v_2)$) respectively, wherein the highest individual comparison score of the individual comparison scores may be the comparison score used in step 205 for determining whether the two target nodes are duplicates with respect to each other. The term "first" is used for naming purpose to indicate that the first version is not a current version. The term "second" is used for naming purpose to indicate that the second version is a current version.

Figure 3:
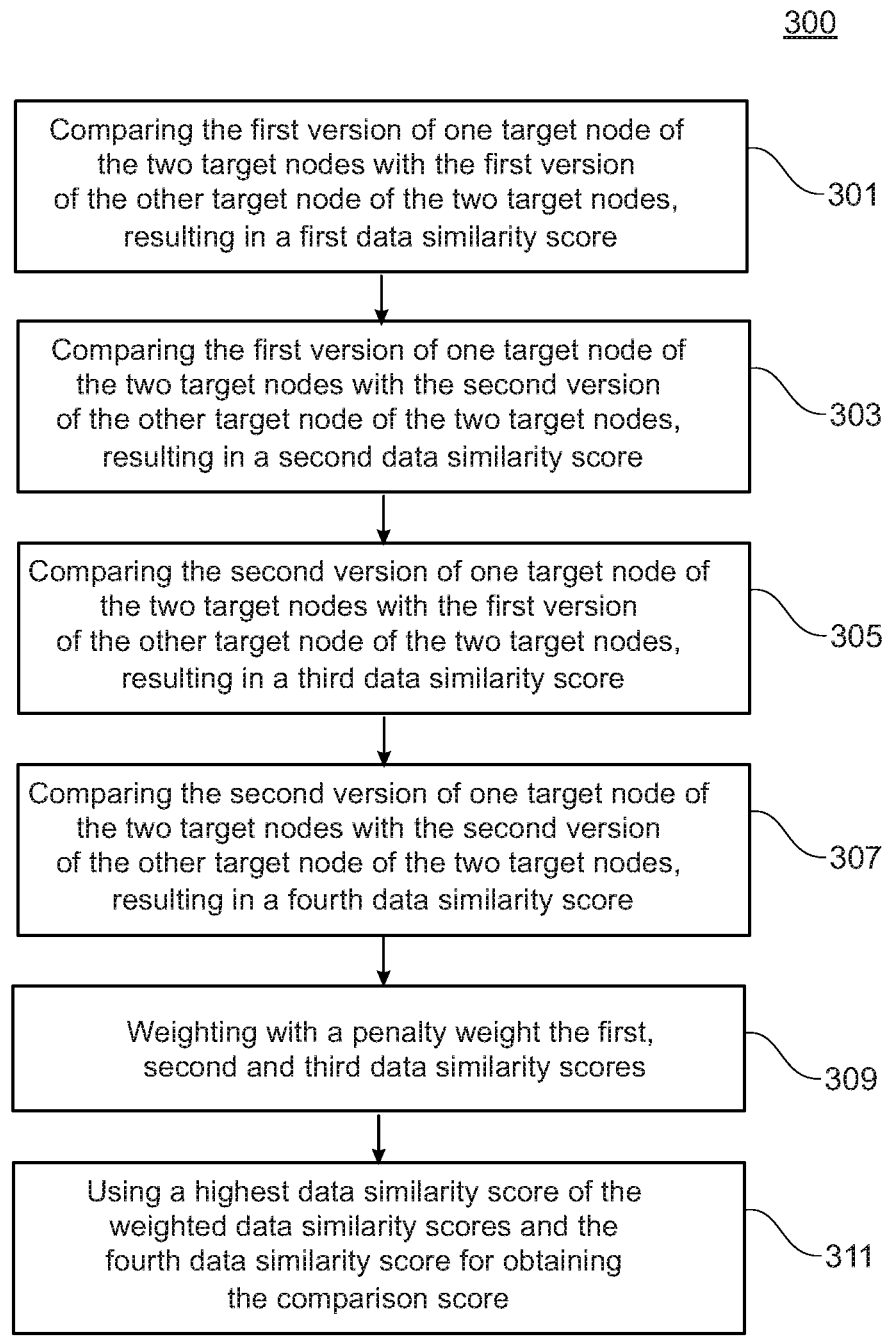
FIG. 3 is a flowchart of a method for computing a comparison score in accordance with an embodiment of the present invention.

Flowchart 300 of FIG. 3 is a flowchart of a method for computing a comparison score in accordance with an embodiment of the present invention. For the purpose of explanation, the method may be implemented in the computer system 100 illustrated in previous FIG. 1, but is not limited to this implementation. The method provides an example implementation of step 203 of FIG. 2. The method may, for example, be performed by the hybrid MDM system 100.

The first version $v_1$ of the target node tnode1 may be compared in step 301 with the first version $v_1$ of the other target node tnode2, resulting in a first data similarity score. This may be performed by comparing individually the entity attributes of the first version $v_1$ of the target node tnode1 with the corresponding entity attributes of the first version $v_1$ of the target node tnode2. This may result in individual scores which may be combined (e.g., summed) to obtain the first data similarity score $DS_1$.

The first version $v_1$ of the target node tnode1 may be compared in step 303 with the second version $v_2$ of the other target node tnode2, resulting in a second data similarity score. This may be performed by comparing individually the entity attributes of the first version $v_1$ of the target node tnode1 with the corresponding entity attributes of the second version $v_2$ of the target node tnode2. This may result in individual scores which may be combined (e.g., summed) to obtain the second data similarity score $DS_2$.

The second version $v_2$ of the target node tnode1 may be compared in step 305 with the first version $v_1$ of the other target node tnode2, resulting in a third data similarity score. This may be performed by comparing individually the entity attributes of the second version $v_2$ of the target node tnode1 with the corresponding entity attributes of the first version $v_1$ of the target node tnode2. This may result in individual scores which may be combined (e.g., summed) to obtain the third data similarity score $DS_3$.

The second version $v_2$ of the target node tnode1 may be compared in step 307 with the second version $v_2$ of the other target node tnode2, resulting in a fourth data similarity score. This may be performed by comparing individually the entity attributes of the second version $v_2$ of the target node tnode1 with the corresponding entity attributes of the second version $v_2$ of the target node tnode2. This may result in individual scores which may be combined (e.g., summed) to obtain the fourth data similarity score $DS_4$.

In step 309, the first $DS_1$, second $DS_2$ and third $DS_3$ data similarity scores may be weighted with a penalty weight p if the three scores resulted from a comparison that involves the old version $v_1$ which is different from the newer version $v_2$. For example, the first data similarity score $DS_1$ involves two previous versions $v_1$. In this case, it may be determined whether the first version $v_1$ of the target node tnode1 is different from the second version $v_2$ of the target node tnode1 and/or the first version $v_1$ of the target node tnode2 is different from the second version $v_2$ of the target node tnode2. If at least one of the two conditions is fulfilled then the score $DS_1$ may be weighted with the penalty weight. The second data similarity score $DS_2$ involves only one version $v_1$ of the target node tnode2. In this case, it may be determined whether the first version $v_1$ of the target node tnode2 is different from the second version $v_2$ of the target node tnode2 and if so the score $DS_2$ may be weighted with the penalty weight. The third data similarity score $DS_3$ involves only one version $v_1$ of the target node tnode1. In this case, it may be determined whether the first version $v_1$ of the target node tnode1 is different from the second version $v_2$ of the target node tnode1 and if so the score $DS_3$ may be weighted with the penalty weight. The fourth data similarity score $DS_4$ resulted from the comparisons of the second versions $v_2$ of the target nodes tnode1 and tnode2 and thus may not be weighted.

Assuming for simplification of the description that all the first $DS_1$, second $DS_2$ and third $DS_3$ data similarity scores may be weighted. This may, for example, result in new first $DS'_1$, second $DS'_2$ and third $DS'_3$ data similarity scores, wherein $DS'_1 = p \times DS_1$, $DS'_2 = p \times DS_2$ and $DS'_3 = p \times DS_3$. In another example, the new first $DS'_1$, second $DS'_2$ and third $DS'_3$ data similarity scores may be obtained by subtraction of the penalty weight as follows: $DS'_1 = DS_1 - p$, $DS'_2 = DS_2 - p$ and $DS'_3 = DS_3 - p$.

The scores $DS'_1$, $DS'_2$, $DS'_3$ and $DS_4$ may be compared to select the highest one. The highest score may be used to obtain in step 311 the comparison score CScore. In one example, the comparison score CScore may be equal to the highest score: $CScore = \max(DS'_1, DS'_2, DS'_3, DS_4)$. For simplification of the description, the method of FIG. 3 provides the example where only one previous first version $v_1$ of the graph is used; that is, the comparison score of step 311 is obtained for the pair $(v_1, v_2)$ of the previous version $v_1$ and the current version $v_2$ of the graph. In case the graph has more than one version that precedes the current version $v_2$ e.g., the graph has a first version $v_0$, another first version $v_1$ of the graph and the current second version $v_2$, steps 301 to 311 may be repeated for obtaining the comparison score for the other pair previous-current versions $(v_0, v_2)$ of the graph, and the highest one of the two comparison scores may be used for determining whether the two target nodes are duplicates with each other.

Figure 4:
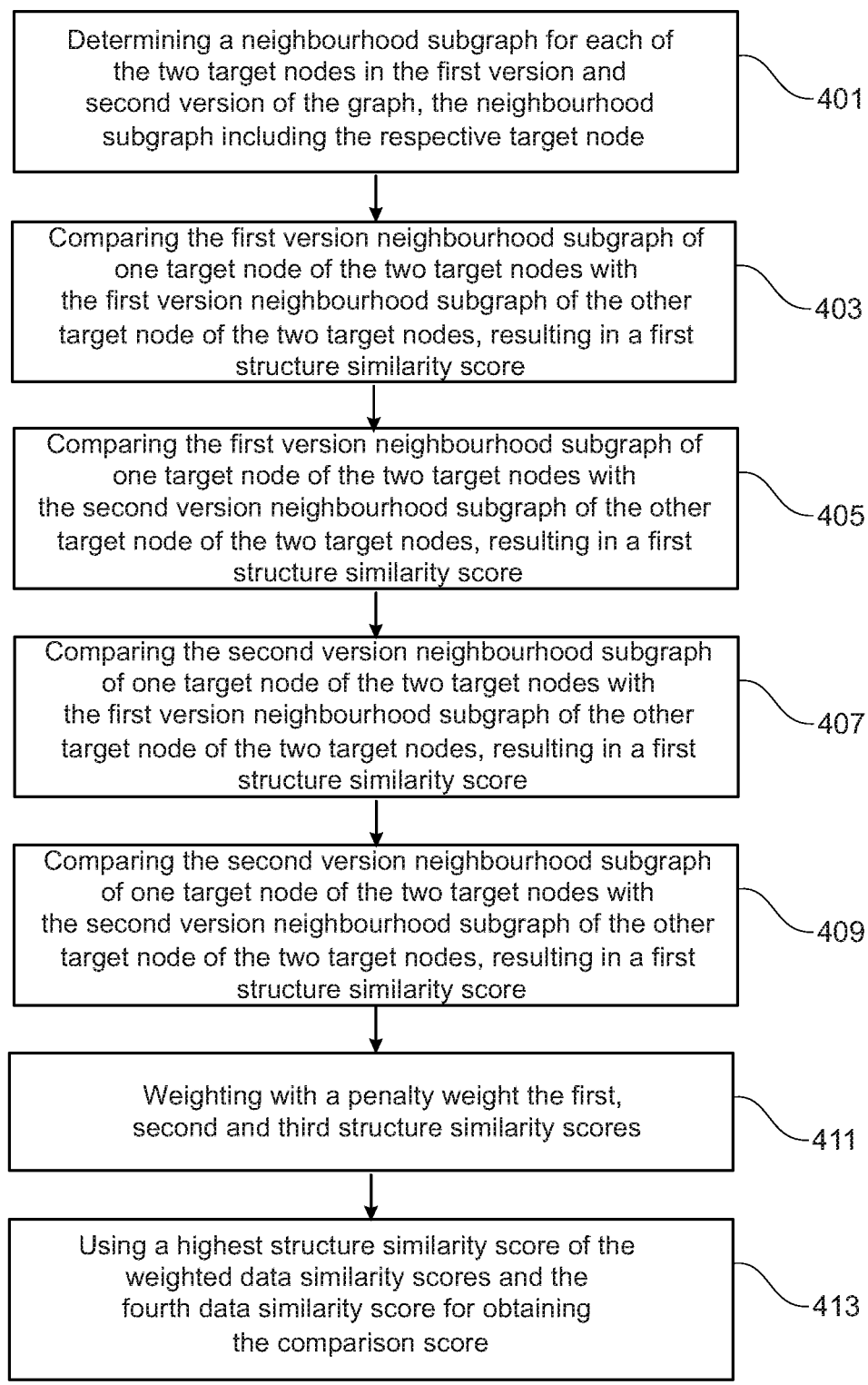
FIG. 4 is a flowchart of a method for computing a comparison score in accordance with an embodiment of the present invention.

Flowchart 400 of FIG. 4 is a flowchart of a method for computing a comparison score in accordance with an embodiment of the present invention. For the purpose of explanation, the method may be implemented in the computer system 100 illustrated in previous FIG. 1, but is not limited to this implementation. The method provides an example implementation of step 203 of FIG. 2. The method may, for example, be performed by the hybrid MDM system 100.

A neighborhood subgraph may be determined in step 401 for each of the two target nodes tnode1 and tnode2 in the first version and second version of the graph, the neighborhood subgraph including the respective target node. This may result in four subgraphs: two subgraphs $SUBG_{v1}^{tnode1}$ and $SUBG_{v2}^{tnode1}$ may be determined for the target node tnode1 in the first and second versions 107a and 107b respectively, and two subgraphs $SUBG_{v1}^{tnode2}$ and $SUBG_{v2}^{tnode2}$ may be determined for the target node tnode2 in the first and second versions 107a and 107b respectively.

The first version neighborhood subgraph $SUBG_{v_1}^{mode1}$ of target node tnode1 may be compared in step 403 with the first version neighborhood subgraph $SUBG_{v_1}^{mode2}$ of the other target node tnode2. This may result in a first structure similarity score $STS_1$.

The first version neighborhood subgraph $SUBG_{v_1}^{mode1}$ of target node tnode1 may be compared in step 405 with the second version neighborhood subgraph $SUBG_{v_2}^{mode1}$ of the other target node tnode2. This may result in a second structure similarity score $STS_2$.

The second version neighborhood subgraph $SUBG_{v_2}^{mode1}$ of target node tnode1 may be compared in step 407 with the first version neighborhood subgraph $SUBG_{v_2}^{mode2}$ of the other target node tnode2. This may result in a third structure similarity score $STS_3$.

The second version neighborhood subgraph $SUBG_{v_2}^{mode1}$ of target node tnode1 may be compared in step 409 with the second version neighborhood subgraph $SUBG_{v_2}^{mode2}$ of the other target node tnode2. This may result in a fourth structure similarity score $STS_4$.

In step 411, the first $STS_1$, second $STS_2$ and third $STS_3$ structure similarity scores may be weighted with a penalty weight p if the three scores resulted from a comparison that involves the old version $v_1$ which is different from the newer version $v_2$. For example, the first structure similarity score $STS_1$ involves two previous versions $v_1$. In this case, it may be determined whether the first version $v_1$ $SUBG_{v_1}^{mode1}$ is different from the second version $v_2$ $SUBG_{v_2}^{mode1}$ and/or the first version $v_1$ $SUBG_{tnode2}$ is different from the second version $v_2$ $SUBG_{v_2}^{mode2}$. If at least one of the two conditions is fulfilled then the score $STS_1$ may be weighted with the penalty weight. The second structure similarity score $STS_2$ involves only one version $v_1$ $SUBG_{b_1}^{mode2}$. In this case, it may be determined whether the first version $v_1$ $SUBG_{v_1}^{mode1}$ is different from the second version $v_2$ $SUBG_{v_2}^{mode2}$ and if so the score $STS_2$ may be weighted with the penalty weight. The third structure similarity score $STS_3$ involves only one version $v_1$ $SUBG_{v_1}^{mode1}$. In this case, it may be determined whether the first version $v_1$ $SUBG_{v_1}^{mode1}$ is different from the second version $v_2$ $SUBG_{v_2}^{mode1}$ and if so the score $STS_3$ may be weighted with the penalty weight. The fourth structure similarity score $STS_4$ resulted from the comparisons of the second versions $v_2$ $SUBG_{v_2}^{mode1}$ and $SUBG_{v_2}^{mode2}$ and thus may not be weighted.

Assuming for simplification of the description that all the first $STS_1$, second $STS_2$ and third $STS_3$ data similarity scores may be weighted. This may, for example, result in new first $STS'_1$, second $STS'_2$ and third $STS'_3$ data similarity scores, wherein $STS'_1 = p \times STS_1$, $STS'_2 = p \times STS_2$ and $STS'_3 = p \times STS_3$. In another example, the new first $STS'_1$, second $STS'_2$ and third $STS'_3$ data similarity scores may be obtained by subtraction of the penalty weight as follows: $STS'_1 = STS_1 - p$, $STS'_2 = STS_2 - p$ and $STS'_3 = STS_3 - p$.

The scores $STS'_1$, $STS'_2$, $STS'_3$ and $STS_4$ may be compared to select the highest score. The highest score may be used to obtain in step 413 the comparison score CScore. In one example, the comparison score CScore may be the highest score: $CScore = \max(STS'_1, STS'_2, STS'_3, STS_4)$. In another example, the comparison score may be a combination of the highest score defined in step 311 and the highest score of step 413 e.g.

$$CScore = \frac{\max(DS'_1, DS'_2, DS'_3, DS_4) + \max(STS'_1, STS'_2, STS'_3, STS_4)}{2}.$$

For simplification of the description, the method of FIG. 4 provides the example where only one previous first version $v_1$ of the graph is used; that is, the comparison score of step 413 is obtained for the pair $(v_1, v_2)$ of the previous version $v_1$ and the current versions $v_2$ of the graph. In case the graph has more than one version that precedes the current version $v_2$ e.g., the graph has a first version $v_0$, another first version $v_1$ of the graph and the current second version $v_2$, steps 401 to 413 may be repeated for obtaining the comparison score for the other pair previous-current versions $(v_0, v_2)$ of the graph, and the highest one of the two comparison scores may be used for determining whether the two target nodes are duplicates with each other.

Figure 5A:
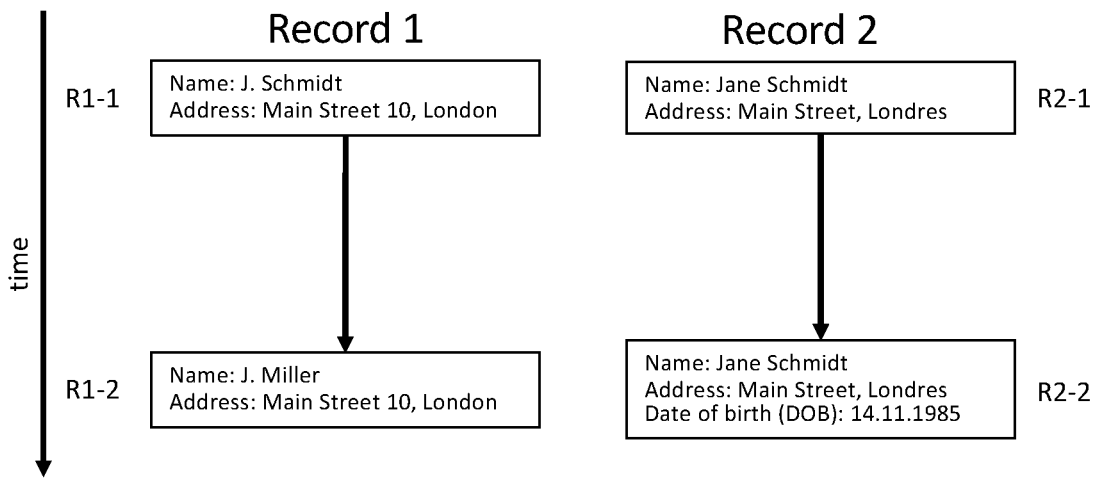
FIG. 5A is a diagram illustrating a method for comparing nodes in accordance with an embodiment of the present invention.

FIG. 5A is a diagram (500A) illustrating a method for comparing nodes in accordance with an embodiment of the present invention. FIG. 5A provides an alternative example implementation for the comparison steps 301 to 307 of FIG. 3.

Record 1 and Record 2 may, for example, be the records represented by the nodes tnode1 and tnode2 respectively. Each of the records may have entity attributes which are the name, address attributes and date of birth (DOB) attribute. The records Record 1 and Record 2 may be from different source systems. For example, a first version of Record 1 named R1-1 may be from a first system that maintains a high quality of data and a first version of Record 2 named R2-1 may be from a second system. Record 1 may be updated in the first system to indicate that Jane has married. Therefore, her last name changed from Schmidt to Miller; this results in a second version named R1-2 of Record 1. However, in the second system her date of birth was added but the record is unaware of the name change, resulting in a second version R2-2 of Record 2.

While the initial records R1-1 and R2-1 are very similar, the records R1-2 and R2-2 are quite different after the updates. This is taken into account by embodiments of the present invention by comparing each version of the attributes with each other. For example, Record 1 changed the name. This creates two different versions of the name that may be compared to the different versions of the name for Record 2. For Record 2 the first version of the name and address attributes is the same as the second version of these attributes.

The entity attributes of each version of Record 1 may be compared with corresponding attributes of each version of Record 2. This is indicated in the table of FIG. 5A. Each comparison yields a score. As indicated in the table, the score is reduced (penalty) when one or both compared attributes are outdated in order to obtain the final scores. On outdated attribute is the first version of the attribute which is different from the second version of the attribute. The table shows the different comparisons. For each of the three attributes, the highest final score may be used to obtain three final scores which may be combined to obtain the comparison score indicative of the similarity between the records Record 1 and Record 2. As shown in FIG. 5A, the highest final score for the name attribute is 0.65, the highest final score for the address attribute is 0.75, and the highest final score for the DOB attribute is 0.4. The comparison score may, for example, be the average: (0.65+0.75+0.4)/3.

Figure 5B:
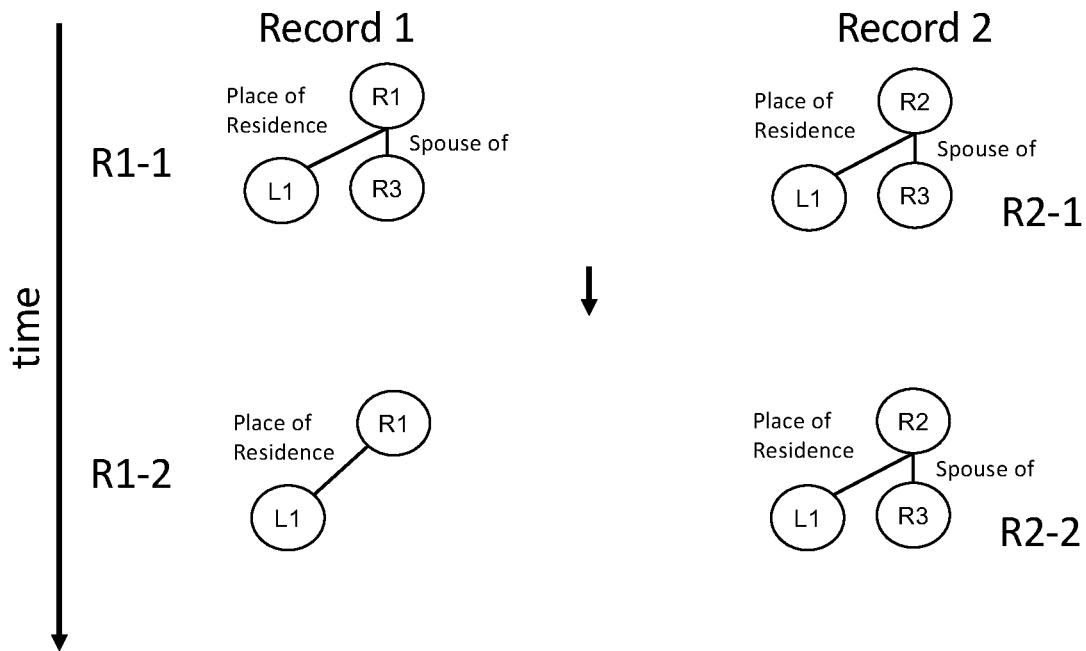
FIG. 5B is a diagram illustrating a method for comparing subgraphs in accordance with an embodiment of the present invention.

FIG. 5B is a diagram (500B) illustrating a method for comparing subgraphs in accordance with an embodiment of the present invention. FIG. 5B provides a simplified example implementation for the comparison steps 403 to 409 of FIG. 4.

The subgraph around Record 1 and Record 2 at different points in time are considered. For example, at a first point of time, the subgraph around Record 1 has a first version named R1-1 and the subgraph around Record 2 has a first version named R2-1. At a later point of time the graph may have a different second version. In this case, the new subgraphs surrounding Record 1 and Record 2 are named R1-2 and R2-2 respectively. As shown in FIG. 5B, the second version R2-2 did not change over time and it is the same as the first version R2-1. By contrast, the second version R1-2 did change over time since the edge between Record 1 and the record R3 is removed e.g., in case the person represented by R1 divorces the person represented by R3. This change may be taken into account by comparing the different versions of the subgraphs.

The comparison between the different versions of the subgraphs are shown in the table of FIG. 5B, where the score is penalized if the comparison involves an outdated subgraph. For example, the score resulting from the comparison between the subgraphs R1-1 and R2-1 is penalized because the subgraph R1-1 is outdated because it changed over time i.e., R1-1 different from R1-2. The comparison between the subgraph R1-2 (or R1-1) and the subgraph R2-2 may be skipped if it is determined that the subgraph R2-2 is the same as the corresponding first version subgraph R2-1 and that the comparison between R1-2 (R1-1) and R2-1 is already performed.

As with the previous example of FIG. 5A, the data of R2 is outdated and does not contain the information yet. Both records have an edge to the same place of residence. This does not change and the high score of 0.9 is recorded for this edge in the subgraph. For the spouse relationship, however, we record a high score for the historic version of the subgraph. This gets a penalty because it is outdated. However, as the relationship is completely removed in the current version the score for the current version is very low and will not be used for the matching decision.

Figure 6:
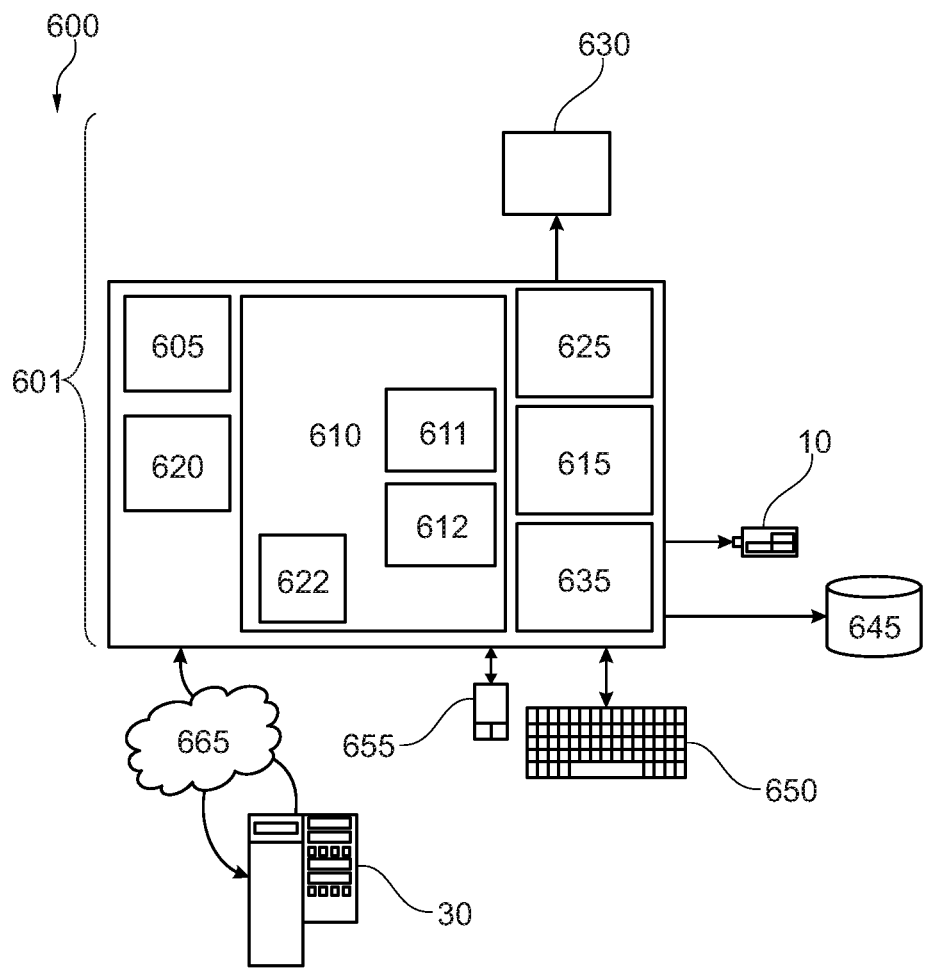
FIG. 6 represents a computerized system, suited for implementing one or more method steps as involved in embodiments of the present invention.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612 e.g. instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

Embodiments of the present invention can be described with the following clauses shown below. It is important to note that these clauses are not the claimed subject matter, but descriptive details for various embodiments of the present invention.

Clause 1. A computer implemented method for duplicate identification in a graph having a second version, the graph comprising nodes representing entities and edges representing relationships between the entities, the method comprising: providing a previous first version of the graph; identifying at least two target nodes of the graph; comparing the first version and the second version of the graph for determining a comparison score indicative of a similarity between the two target nodes; using the comparison score for determining whether the two target nodes are duplicates with respect to each other.

Clause 2. The method of clause 1, wherein comparing the first version and the second version of the graph includes: comparing the first version of one target node of the two target nodes with the first version of the other target node of the two target nodes, resulting in a first data similarity score; comparing the first version of the one target node with the second version of the other target node, resulting in a second data similarity score; comparing the second version of the one target node with the first version of the other target node, resulting in a third data similarity score; comparing the second version of the one target node with the second version of the other target node, resulting in a fourth data similarity score; weighting with a penalty weight the first, second and third data similarity scores that resulted from a comparison involving the first version of a node which is different from the second version of the node; using a highest data similarity score of the weighted data similarity scores and the fourth data similarity score for obtaining the comparison score.

Clause 3. The method of clause 2, wherein the entity has a set of entity attributes, wherein comparing a given version of the one target node with a given version of the other target node, the given version being the first or second version, comprises: for each entity attribute of the set of entity attributes: comparing each version of the entity attribute of the one target node with each version of said entity attribute of the other target node, each comparison resulting in an individual data similarity score; and combining the individual data similarity scores for obtaining one of the first, second, third or fourth data similarity score.

Clause 4. The method of clause 1, wherein the entity has a set of entity attributes, wherein comparing the first version and the second version of the graph comprises: comparing the entity attributes of the two target nodes comprising: for each entity attribute of the entity attributes: comparing each version of the entity attribute of one target node with each version of said entity attribute of the other node, each comparison resulting in an individual data similarity score; weighting with a penalty weight the individual data similarity scores that resulted from a comparison involving the first version of an entity attribute which is different from the second version of the entity attribute; selecting a highest data similarity score of the individual data similarity scores of the entity attribute; and combining the selected data similarity scores of the set of entity attributes for obtaining the comparison score.

Clause 5. The method of clause 1, comparing the first version and the second version of the graph including: determining a neighbourhood subgraph for each of the two target nodes in the first version and second version of the graph, the neighbourhood subgraph including the respective target node; comparing the first version neighbourhood subgraph of one target node of the two target nodes with the first version neighbourhood subgraph of the other target node of the two target nodes, resulting in a first structure similarity score; comparing the first version neighbourhood subgraph of the one target node with the second version neighbourhood subgraph of the other target node, resulting in a second structure similarity score; comparing the second version neighbourhood subgraph of the one target node with the first version neighbourhood subgraph of the other target node, resulting in a third structure similarity score; comparing the second version neighbourhood subgraph of the one target node with the second version neighbourhood subgraph of the other target node, resulting in a fourth structure similarity score; weighting with a penalty weight the first, second and third structure similarity scores that resulted from a comparison involving the first version of a subgraph which is different from the second version of the subgraph; using a highest structure similarity score of the weighted structure similarity scores and the fourth structure similarity score for obtaining the comparison score.

Clause 6. The method of clause 2, including the method of clause 5, wherein obtaining the comparison score includes combining the highest structure similarity score with the highest data similarity score.

Clause 7. The method of clause 5 or clause 6, wherein comparing a given version of the neighboring subgraph of the one target node with a given version of the neighboring subgraph of the other target node, the given version being the first or second version, includes: comparing each edge of the given version of the neighboring subgraph of the target node with a corresponding edge of the given version of the neighboring subgraph of the other target node, resulting in an individual structure similarity score; combining the individual structure similarity scores for obtaining one of the first, second, third or fourth structure similarity score.

Clause 8. The method of clause 1, wherein comparing the first version and the second version of the graph includes: determining a neighbourhood subgraph for each of the two target nodes in the first version and second version of the graph, the neighbourhood subgraph including the respective target node; comparing each version of the neighboring subgraph of the target node with each version of the neighboring subgraph of the other target node; wherein comparing a given version of the neighboring subgraph of the target node with a given version of the neighboring subgraph of the other target node, the given version being the first or second version, comprises: comparing each edge of the given version of the neighboring subgraph of the target node with a corresponding edge of the given version of the neighboring subgraph of the other target node, resulting in an individual structure similarity score; weighting with a penalty weight the individual structure similarity scores if they resulted from a comparison involving the first version; combining the individual structure similarity scores for obtaining the comparison score.

Clause 9. The method of any of the preceding clauses 5 to 8, the determining of the neighbourhood subgraph of the node including: selecting nodes of the graph using a selection criterion, the selection criterion being based on at least one of: a number of nodes, an entity represented by a node, a distance between the node and another node in the subgraph; the subgraph comprising the selected nodes.

Clause 10. The method of clause 9, the selection criterion requiring at least one of: the number of nodes of the subgraph being smaller than a maximum number; the edge of the subgraph connected to at least one node that represents a same entity as the entity of the node; and the distance between the node and another node in the subgraph is smaller than a threshold number of edges.

Clause 11. The method of any of the preceding clauses 5 to 10, the determining of the neighborhood subgraphs including removing duplicate nodes of each subgraph of the neighborhood subgraphs.

Clause 12. The method of any preceding clause 1 to 11, further including using a received indication of the two identified target nodes for the identifying of the target nodes.

Clause 13. The method of any preceding clause 11 to 12, wherein determining whether the two target nodes are duplicates with respect to each other includes: in case the comparison score is higher than an upper threshold, determining that that the two target nodes are duplicates with each other; in case the comparison score is between a lower and the upper thresholds prompting a user for determining whether the two target nodes are duplicates with respect to each other.

The present invention may be a system, a method, and/or a computer program product at any possible technical detail level of integration. The computer program product may include a computer readable storage medium (or media) having computer readable program instructions thereon for causing a processor to carry out aspects of the present invention. A 'processor' as used herein encompasses an electronic component which is able to execute a program or machine executable instruction or computer executable code. The processor may for instance be a multi-core processor. A processor may also refer to a collection of processors within a single computer system or distributed amongst multiple computer systems. The computer executable code may be executed by multiple processors that may be within the same computing device or which may even be distributed across multiple computing devices.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some helpful definitions for understanding certain terms that are used throughout this document are provided below:
Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.
Embodiment: see definition of "present invention" above—similar cautions apply to the term "embodiment."
and/or: inclusive or; for example, A, B "and/or" C means that at least one of A or B or C is true and applicable.
Including/include/includes: unless otherwise explicitly noted, means "including but not necessarily limited to."
User/subscriber: includes, but is not necessarily limited to, the following: (i) a single individual human; (ii) an artificial intelligence entity with sufficient intelligence to act as a user or subscriber; and/or (iii) a group of related users or subscribers.
Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.
Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.
Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for determining duplicates in a graph in a hybrid master data management system based on different versions of the graph, comprising:
    providing a first version of a graph, with the first version of the graph being a previous version of the graph stored on a virtual master data management (MDM) system, the virtual MDM system being configured to store and create data in a distributed arrangement across one or more source systems;
    identifying at least two target nodes of the graph, wherein each node of the at least two target nodes has a set of entity attributes and for each entity attribute of the set of entity attributes:
        comparing each version of an entity attribute of one target node with each version of the entity attribute of a second target node, with each comparison resulting in an individual data similarity score;
        weighting with a penalty weight the individual data similarity scores that resulted from a comparison involving a first version of the entity attribute that is different from a second version of the entity attribute;
        selecting a highest data similarity score of the individual data similarity scores of the entity attribute; and
        combining the selected highest data similarity scores of the set of entity attributes for obtaining a comparison score;
    comparing the first version and a second version of the graph for determining the comparison score indicative of a similarity between the two target nodes, the second version being a current version of the graph stored on a physical MDM system, the physical MDM system being configured to store and create data in a centralized system; and
    using the comparison score for determining whether the two target nodes are duplicates with respect to each other.

2. The method of claim 1, wherein comparing the first version and the second version of the graph includes:
    comparing the first version of one target node of the two target nodes with the first version of the other target node of the two target nodes, resulting in a first data similarity score;
    comparing the first version of the one target node with the second version of the other target node, resulting in a second data similarity score;
    comparing the second version of the one target node with the first version of the other target node, resulting in a third data similarity score;
    comparing the second version of the one target node with the second version of the other target node, resulting in a fourth data similarity score;
    weighting with a penalty weight the first, second and third data similarity scores that resulted from a comparison involving the first version of a node which is different from the second version of the node;
    using a highest data similarity score of the weighted data similarity scores and the fourth data similarity score for obtaining the comparison score.

3. The method of claim 2, wherein the entity has a set of entity attributes, wherein comparing a given version of the one target node with a given version of the other target node, the given version being the first or second version, includes, for each entity attribute of the set of entity attributes:
    comparing each version of the entity attribute of the one target node with each version of the entity attribute of the other target node, each comparison resulting in an individual data similarity score; and
    combining the individual data similarity scores for obtaining one of the first, second, third or fourth data similarity score.

4. The method of claim 1, comparing the first version and the second version of the graph including:
    determining a neighbourhood subgraph for each of the two target nodes in the first version and second version of the graph, the neighbourhood subgraph including the respective target node;
    comparing the first version neighbourhood subgraph of one target node of the two target nodes with the first version neighbourhood subgraph of the other target node of the two target nodes, resulting in a first structure similarity score;
    comparing the first version neighbourhood subgraph of the one target node with the second version neighbourhood subgraph of the other target node, resulting in a second structure similarity score;
    comparing the second version neighbourhood subgraph of the one target node with the first version neighbourhood subgraph of the other target node, resulting in a third structure similarity score;
    comparing the second version neighbourhood subgraph of the one target node with the second version neighbourhood subgraph of the other target node, resulting in a fourth structure similarity score;
    weighting with a penalty weight the first, second and third structure similarity scores that resulted from a comparison involving the first version of a subgraph which is different from the second version of the subgraph; and
    using a highest structure similarity score of the weighted structure similarity scores and the fourth structure similarity score for obtaining the comparison score.

5. The method of claim 2, wherein obtaining the comparison score includes combining the highest structure similarity score with the highest data similarity score.

6. The method of claim 4, wherein comparing a given version of the neighboring subgraph of the one target node with a given version of the neighboring subgraph of the other target node, the given version being the first or second version, includes:
   comparing each edge of the given version of the neighboring subgraph of the target node with a corresponding edge of the given version of the neighboring subgraph of the other target node, resulting in an individual structure similarity score; and
   combining the individual structure similarity scores for obtaining one of the first, second, third or fourth structure similarity score.

7. The method of claim 1, wherein comparing the at least one first version and the second version of the graph includes:
   determining a neighbourhood subgraph for each of the two target nodes in the at least one first version and second version of the graph, the neighbourhood subgraph including the respective target node; and
   comparing each version of the neighboring subgraph of the target node with each version of the neighboring subgraph of the other target node;
   wherein comparing a given version of the neighboring subgraph of the target node with a given version of the neighboring subgraph of the other target node, the given version being the first or second version, includes:
      comparing each edge of the given version of the neighboring subgraph of the target node with a corresponding edge of the given version of the neighboring subgraph of the other target node, resulting in an individual structure similarity score;
      weighting with a penalty weight the individual structure similarity scores if they resulted from a comparison involving the first version; and
      combining the individual structure similarity scores for obtaining the comparison score.

8. The method of claim 4, the determining of the neighbourhood subgraph of the node including:
   selecting nodes of the graph using a selection criterion, with the selection criterion being based on at least one of: a number of nodes, an entity represented by a node, a distance between the node and another node in the subgraph; and
   the subgraph includes the selected nodes.

9. The method of claim 8, the selection criterion requiring at least one of:
   the number of nodes of the subgraph being smaller than a maximum number;
the edge of the subgraph connected to at least one node that represents a same entity as the entity of the node; and
   the distance between the node and another node in the subgraph is smaller than a threshold number of edges.

10. The method of claim 4, the determining of the neighborhood subgraphs including removing duplicate nodes of each subgraph of the neighborhood subgraphs.

11. The method of claim 1, further including using a received indication of the two identified target nodes for the identifying of the target nodes.

12. The method of claim 1, wherein determining whether the two target nodes are duplicates with respect to each other includes: in case the comparison score is higher than an upper threshold, determining that that the two target nodes are duplicates with each other; in case the comparison score is between a lower and the upper thresholds prompting a user for determining whether the two target nodes are duplicates with respect to each other.

13. The method of claim 1, wherein comparing the at least one previous first version and the second version of the graph includes:
   comparing each version of one target node with each version of the other target node resulting in data similarity scores respectively;
   weighting with a penalty weight the data similarity scores that resulted from a comparison involving the previous first version of a node which is different from the second version of the node; and
   using a highest data similarity score of the weighted data similarity scores and the non-weighted data similarity scores for obtaining the comparison score.

14. A computer program product for determining duplicates in a graph in a hybrid master data management system based on different versions of the graph, comprising:
   a computer-readable storage medium; and
   computer code stored on the computer-readable storage medium, with the computer code including instructions and data for causing a processor(s) to perform operations including the following:
      providing a first version of a graph, with the first version of the graph being a previous version of the graph stored on a virtual master data management (MDM) system, the virtual MDM system being configured to store and create data in a distributed arrangement across one or more source systems,
      identifying at least two target nodes of the graph, wherein each node of the at least two target nodes has a set of entity attributes and for each entity attribute of the set of entity attributes:
         comparing each version of an entity attribute of one target node with each version of the entity attribute of a second target node, with each comparison resulting in an individual data similarity score;
         weighting with a penalty weight the individual data similarity scores that resulted from a comparison involving a first version of the entity attribute that is different from a second version of the entity attribute;
         selecting a highest data similarity score of the individual data similarity scores of the entity attribute; and
         combining the selected highest data similarity scores of the set of entity attributes for obtaining a comparison score,
      comparing the first version and the second version of the graph for determining the comparison score indicative of a similarity between the two target nodes, the second version being a current version of the graph stored on a physical MDM system, the physical MDM system being configured to store and create data in a centralized system, and
      using the comparison score for determining whether the two target nodes are duplicates with respect to each other.

15. A computer system for determining duplicates in a graph in a hybrid master data management system based on different versions of the graph, comprising:
   a processor(s) set;
   a computer-readable storage medium; and
   computer code stored on the computer-readable storage medium, with the computer code including instructions and data for causing the processor(s) to perform operations including the following:

providing a first version of a graph, with the first version of the graph being a previous version of the graph stored on a virtual master data management (MDM) system, the virtual MDM system being configured to store and create data in a distributed arrangement across one or more source systems, identifying at least two target nodes of the graph, wherein each node of the at least two target nodes has a set of entity attributes and for each entity attribute of the set of entity attributes:

comparing each version of an entity attribute of one target node with each version of the entity attribute of a second target node, with each comparison resulting in an individual data similarity score;

weighting with a penalty weight the individual data similarity scores that resulted from a comparison involving a first version of the entity attribute that is different from a second version of the entity attribute;

selecting a highest data similarity score of the individual data similarity scores of the entity attribute; and combining the selected highest data similarity scores of the set of entity attributes for obtaining a comparison score, comparing the first version and the second version of the graph for determining the comparison score indicative of a similarity between the two target nodes, the second version being a current version of the graph stored on a physical MDM system, the physical MDM system being configured to store and create data in a centralized system, and using the comparison score for determining whether the two target nodes are duplicates with respect to each other.

16. The computer system of claim 15, being a hybrid virtual-physical master data management (MDM) system, the MDM system comprising an entity event management notification component that is configured to capture changes of the first version graph caused by one or more data sources, and invoking a persistent service of the MDM system for updating the persisted first version of the graph to obtain the second version of the graph.

* * * * *